US010969790B2

(12) United States Patent
Maeda

(10) Patent No.: US 10,969,790 B2
(45) Date of Patent: Apr. 6, 2021

(54) AUTONOMOUS MOBILE APPARATUS, METHOD FOR CONTROLLING THE SAME, AND RECORDING MEDIUM

(71) Applicant: CASIO COMPUTER CO., LTD., Tokyo (JP)

(72) Inventor: Maki Maeda, Mitaka (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 136 days.

(21) Appl. No.: 16/280,846

(22) Filed: Feb. 20, 2019

(65) Prior Publication Data
US 2019/0294171 A1 Sep. 26, 2019

(30) Foreign Application Priority Data
Mar. 23, 2018 (JP) .............................. JP2018-056146

(51) Int. Cl.
*G05D 1/02* (2020.01)
(52) U.S. Cl.
CPC ......... *G05D 1/0214* (2013.01); *G05D 1/0231* (2013.01); *G05D 2201/0214* (2013.01)
(58) Field of Classification Search
CPC ............. G05D 1/0214; G05D 1/0231; G05D 2201/0214; G05D 1/0217; G05D 1/0274; G05D 2201/0217; G05D 1/0246
See application file for complete search history.

(56) References Cited

U.S. PATENT DOCUMENTS

| 7,769,491 | B2 | 8/2010 | Fukuchi et al. |
| 8,886,385 | B2* | 11/2014 | Takahashi .............. G05D 1/024 701/25 |
| 9,073,223 | B2* | 7/2015 | Sato ...................... B25J 13/087 |
| 2011/0166737 | A1 | 7/2011 | Tanaka et al. |
| 2017/0177001 | A1* | 6/2017 | Cao ......................... A47L 9/2852 |
| 2018/0089013 | A1* | 3/2018 | Otsuka .................. G06F 11/324 |

FOREIGN PATENT DOCUMENTS

| JP | 2005313308 A | 11/2005 |
| JP | 2006205348 A | 8/2006 |
| JP | 2006239844 A | 9/2006 |
| JP | 2017209750 A | 11/2017 |

OTHER PUBLICATIONS

Indian Office Action (and English language translation thereof) dated Aug. 18, 2020 issued in Indian Application No. 201914007682.
Rus, "A physical implementation of the self-reconfiguring crystalline robot." Proceedings 2000 ICRA. Millennium Conference. IEEE International Conference on Robotics and Automation. Symposia Proceedings (Cat. No. 00CH37065). vol. 2. IEEE, 2000.

\* cited by examiner

Primary Examiner — Rodney A Butler
(74) Attorney, Agent, or Firm — Holtz, Holtz & Volek PC

(57) ABSTRACT

In an autonomous mobile apparatus, a processor acquires map information including positional information of an obstacle, plans, based on the acquired map information, a shape of the autonomous mobile apparatus and a traveling path of the autonomous mobile apparatus to avoid contact between the autonomous mobile apparatus and the obstacle when the autonomous mobile apparatus is traveling along the traveling path, and causes the autonomous mobile apparatus to autonomously travel along the planned traveling path while assuming the planned shape.

16 Claims, 9 Drawing Sheets

FIG. 5

OPARATION TABLE 190

| CONDITION | OPERATION | CANDIDATE FOR POSTURE |
|---|---|---|
| HUMAN BEING IS RECOGNIZED | MOVE TO A HUMAN BEING WHILE EXPRESSING AN INTEREST | POSTURE A, POSTURE B, ⋯ |
| MUSIC IS HEARD | MOVE AROUND HAPPILY | POSTURE C, POSTURE D, ⋯ |
| CONVERSATION IS HEARD | WANDER WITH A DIFFERENT FACIAL EXPRESSION | POSTURE A, POSTURE E, ⋯ |
| LOUD NOISE IS HEARD | LOOK AROUND SURPRISINGLY | POSTURE C, POSTURE F, ⋯ |
| PATTED BY SOMEONE | GIVE A JOYFUL LOOK | POSTURE A, POSTURE C, ⋯ |
| TEMPERATURE IS HIGH | MOVE TO FIND A COOLER PLACE WITH FACIAL EXPRESSION OF FEELING HOT | POSTURE B, POSTURE G, ⋯ |
| TEMPERATURE IS LOW | MOVE TO FIND A WARMER PLACE WITH FACIAL EXPRESSION OF FEELING COLD | POSTURE B, POSTURE D, ⋯ |
| IT IS TIME FOR BED | MOVE TO THE CHARGING STATION WITH FACIAL EXPRESSION OF BEING SLEEPY | POSTURE C, POSTURE G, ⋯ |
| ⋮ | ⋮ | ⋮ |

US 10,969,790 B2

AUTONOMOUS MOBILE APPARATUS, METHOD FOR CONTROLLING THE SAME, AND RECORDING MEDIUM

CROSS-REFERENCE TO RELATED APPLICATION

This application claims the benefit of Japanese Patent Application No. 2018-056146, filed on Mar. 23, 2018, the entire disclosure of which is incorporated by reference herein.

FIELD

The present disclosure relates to an autonomous mobile apparatus, a method for controlling the same, and a recording medium.

BACKGROUND

Autonomous mobile apparatuses capable of traveling are known. For example, Unexamined Japanese Patent Application Kokai Publication No. 2006-205348 discloses a mobile robot apparatus that autonomously plans a path based on an environment map to avoid an obstacle.

SUMMARY

An autonomous mobile apparatus according to an aspect of the present disclosure includes a processor. The processor is configured to acquire map information including positional information of an obstacle; plan, based on the acquired map information, a shape of the autonomous mobile apparatus and a traveling path of the autonomous mobile apparatus to avoid contact between the autonomous mobile apparatus and the obstacle when the autonomous mobile apparatus is traveling along the traveling path; and cause the autonomous mobile apparatus to autonomously travel along the planned traveling path while assuming the planned shape.

A method for controlling an autonomous mobile apparatus according to an aspect of the present disclosure includes acquiring map information including positional information of an obstacle; planning, based on the acquired map information, a shape of the autonomous mobile apparatus and a traveling path of the autonomous mobile apparatus to avoid contact between the autonomous mobile apparatus and the obstacle when the autonomous mobile apparatus is traveling along the traveling path; and causing the autonomous mobile apparatus to autonomously travel along the planned traveling path while assuming the planned shape.

A non-transitory recording medium according to an aspect of the present disclosure stores a program causing a computer to acquire map information including positional information of an obstacle; plan, based on the acquired map information, a shape of the autonomous mobile apparatus and a traveling path of the autonomous mobile apparatus to avoid contact between the autonomous mobile apparatus and the obstacle when the autonomous mobile apparatus is traveling along the traveling path; and cause the autonomous mobile apparatus to autonomously travel along the traveling path while assuming the planned shape.

BRIEF DESCRIPTION OF THE DRAWINGS

A more complete understanding of this application can be obtained when the following detailed description is considered in conjunction with the following drawings, in which:

FIG. 5 shows an example of an operation table defining operations of the robot according to the embodiment of the present disclosure;

DETAILED DESCRIPTION

Embodiments of the present disclosure will now be described with reference to the drawings. Identical reference symbols are given to identical or equivalent parts throughout the drawings.

Figure 1:
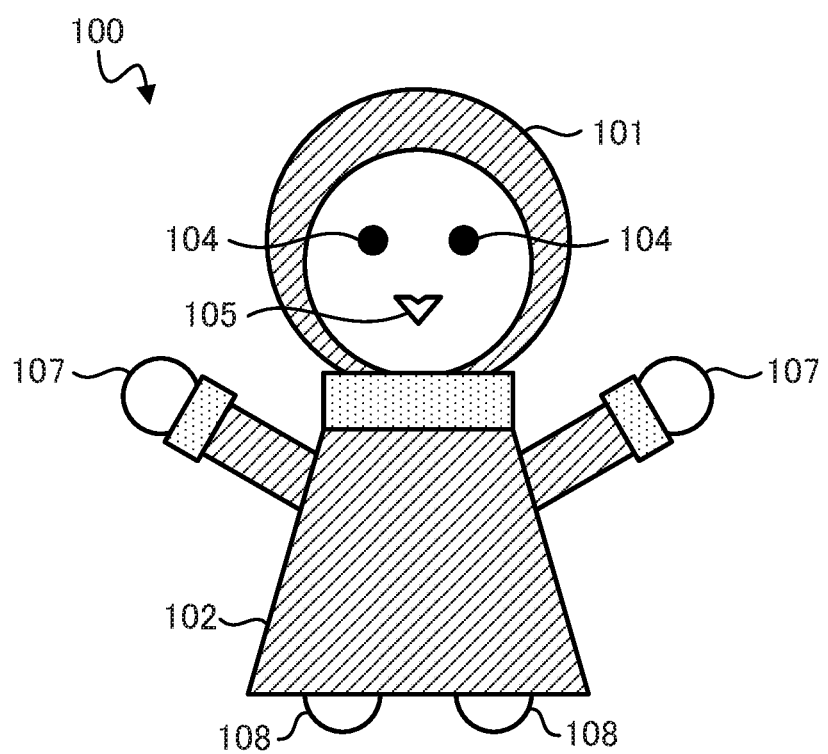
FIG. 1 is an external view of a robot according to an embodiment of the present disclosure.

FIG. 1 is an external view of a robot 100 representing an autonomous mobile apparatus according to an embodiment of the present disclosure. The robot 100 is an apparatus that is in a shape mimicking a human being (a child) and is designed to operate (move) autonomously in accordance with a predefined operation program.

The robot 100 performs various operations in response to an external stimulus, such as talking to, or contact with, the robot 100 made by a certain target located outside the robot 100. In this way, the robot 100 can communicate and interact with a certain target. A certain target is located outside the robot 100 and is to communicate and interact with the robot 100. Specific examples of a certain target include the user who is an owner of the robot 100, any person near the user (for example, the user's family member or friend), and an animal near the user (for example, a pet kept by the user or some other person). A certain target may be called a communication partner, a communication companion, an interaction partner, an interaction companion, or the like.

As illustrated in FIG. 1, the robot 100 is three-dimensionally formed to mimic a human being (a child) in appearance. The robot 100 is made of a hard synthetic resin, such as plastics, as a major material. The robot 100 includes a head 101, a torso 102, eyes 104, a mouth 105, arms 107, and legs 108.

The head 101, the arms 107, and the legs 108 are the parts that can be moved by a driving member built in the robot 100. The head 101 is attached to the torso 102 via a neck joint disposed on the neck such that the head 101 is rotatable in three directions: pitch, roll, and yaw. A display 117 for showing an image related to an eye (an eyeball, for example) is disposed at the eye 104. An imager 115a for imaging a region in front of the robot 100 is disposed at the mouth 105.

Figure 2:
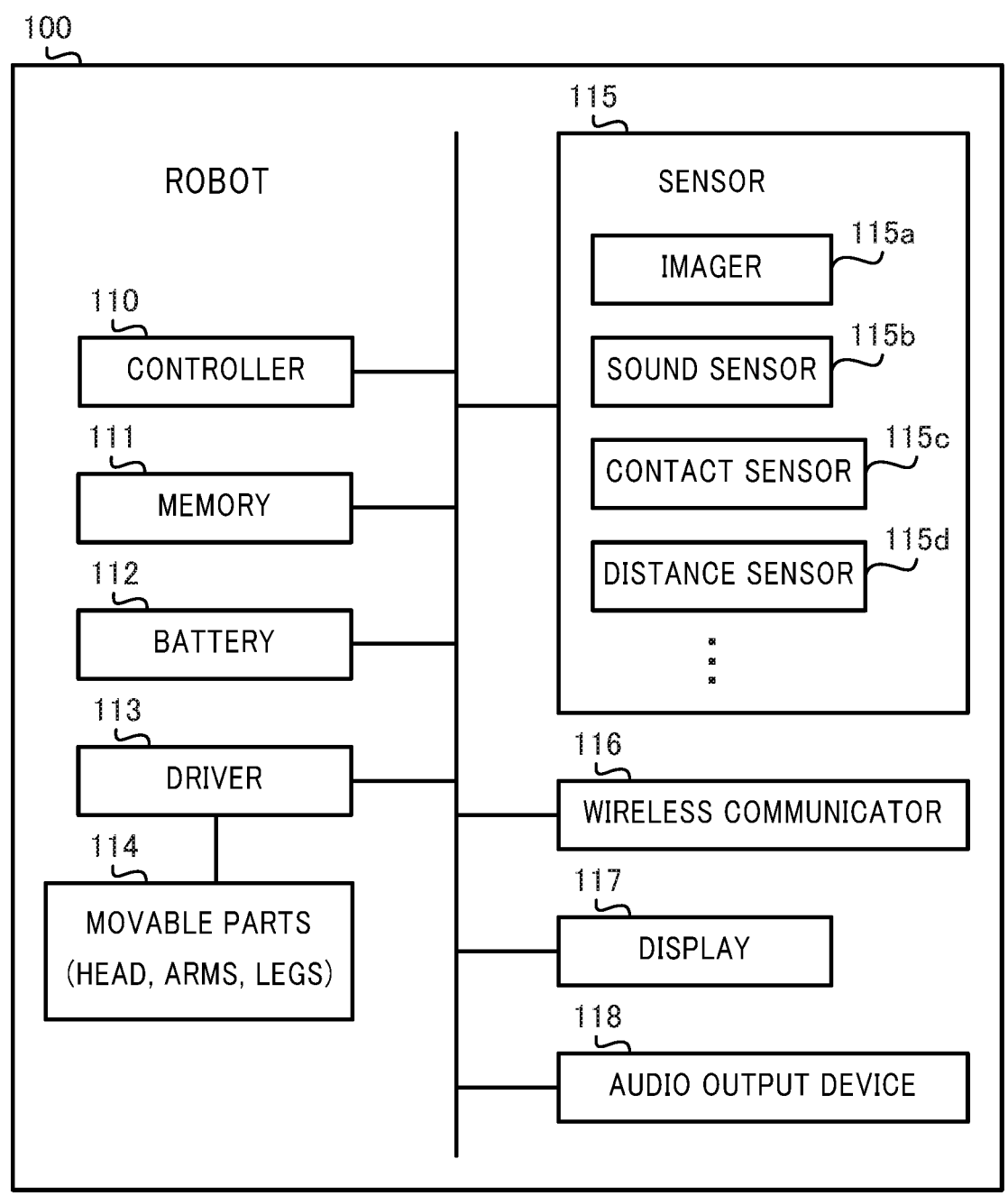
FIG. 2 is a block diagram illustrating a hardware configuration of the robot according to the embodiment of the present disclosure.

FIG. 2 illustrates a hardware configuration of the robot 100. As shown in FIG. 2, the robot 100 includes a controller 110, a memory 111, a battery 112, a driver 113, movable parts 114, a sensor 115, a wireless communicator 116, a display 117, and an audio output device 118.

The controller 110 includes a central processing unit (CPU), a read-only memory (ROM), and a random-access memory (RAM). The CPU, an example of which may be a microprocessor, is a central processing unit configured to carry out various processes and calculations. In the controller 110, the CPU reads a control program stored in the ROM and controls all the operations of the robot 100 while using the RAM as a work memory.

The memory 111 is a non-volatile memory such as a flash memory or a hard disk. The memory 111 stores programs and data, including an operating system (OS) and application programs, to be used by the controller 110 for carrying out various processes. In addition, the memory 111 stores data generated or acquired through various processes carried out by the controller 110.

The battery 112 is a storage battery that stores electric energy and supplies electric power to individual components of the robot 100. The battery 112 becomes recharged at a charging station when the robot 100 returns to the charging station.

The driver 113 includes driving members and a drive circuit used to drive these driving members, the driving members including a motor or actuator used to drive the movable parts 114 of the robot 100. The movable parts 114 are those parts which can be moved, or more specifically, those parts which can be driven relative to the torso 102, including the head 101, the arms 107, the legs 108, and the like. The controller 110 sends control signals to the drive circuit based on an operation program. The drive circuit supplies driving pulse signals to the driving members in accordance with the control signals sent from the controller 110. The driving members drive the movable parts 114 in accordance with the pulse signals supplied by the drive circuit.

The driver 113 drives the movable parts 114 so that the robot 100 can perform various operations. For example, the robot 100 can move forward and backward and change the orientation of the robot 100 by moving the legs 108. Note that the legs 108 are equipped with wheels, and the robot 100 may be allowed to change its position or orientation by the driver 113 driving the wheels to rotate. The robot 100 can mimic behaviors and gestures of a human being by moving the head 101 or the arms 107.

The sensor 115 includes a plurality of sensor devices that detect physical quantities around or inside the robot 100. As illustrated in FIG. 2, the sensor 115 includes an imager 115a for imaging surroundings, a sound sensor 115b for detecting a sound, a contact sensor 115c for detecting contact with the robot 100, and a distance sensor 115d for detecting a distance to a nearby object. The sensor 115 further includes other sensor devices (not illustrated) including, for example, an acceleration sensor for detecting movement of the robot 100, a gyroscope sensor for detecting rotation of the robot 100, a geomagnetic sensor for detecting orientation of the robot 100, a temperature sensor for detecting temperature around the robot 100, and an atmospheric pressure sensor for detecting pressure around the robot 100.

The imager 115a, which is the so-called camera, is disposed at the mouth 105. The imager 115a includes an image acquirer and an image processor, where the image acquirer acquires an image of the object by collecting the light emitted by the object, and the image processor processes the image acquired by the image acquirer. The sound sensor 115b is disposed on the head 101 to detect sounds produced by a certain target, environmental sounds made in a surrounding region, and so on. As part of the sound sensor 115b, the robot 100 includes a plurality of microphones (not illustrated) disposed all around the head 101 so that sounds coming from every direction can be detected efficiently. The other sensor devices are disposed at various positions in or on the robot 100 to acquire information indicating the states around and inside the robot 100. The other sensor devices are disposed at appropriate positions in or on the robot 100. The sensor 115 uses the plurality of sensor devices to acquire information indicating the states around and inside the robot 100 and supplies the acquired information to the controller 110.

The wireless communicator 116 includes an interface for communicating wirelessly with external devices. Under control of the controller 110, the wireless communicator 116 wirelessly communicates with the charging station used for recharging the robot 100, a cloud server, or other external devices, in accordance with communication standards such as wireless local area network (LAN) like Wi-Fi (Wireless Fidelity), Bluetooth®, or near-field communication (NFC).

The display 117 is a display device such as a liquid crystal display, an organic electro-luminescence (EL) display, or a light-emitting diode (LED) display. The display 117, which is disposed at the eyeball portion of the eye 104, shows a variety of images in accordance with the current state, under control of a non-illustrated display drive circuit.

The audio output device 118, which includes a speaker and an audio output interface, converts the audio data generated by the controller 110 into a sound and externally outputs the sound. The speaker is disposed on the head 101. The audio output device 118 outputs a variety of sounds including vocalizations of animals and words uttered by human beings. For example, the robot 100 uses the sound sensor 115b to collect sounds made by a certain target and outputs, from the audio output device 118, a sound responding to an utterance given by the certain target. In this way, the robot 100 can make a brief conversation with a certain target.

Figure 3:
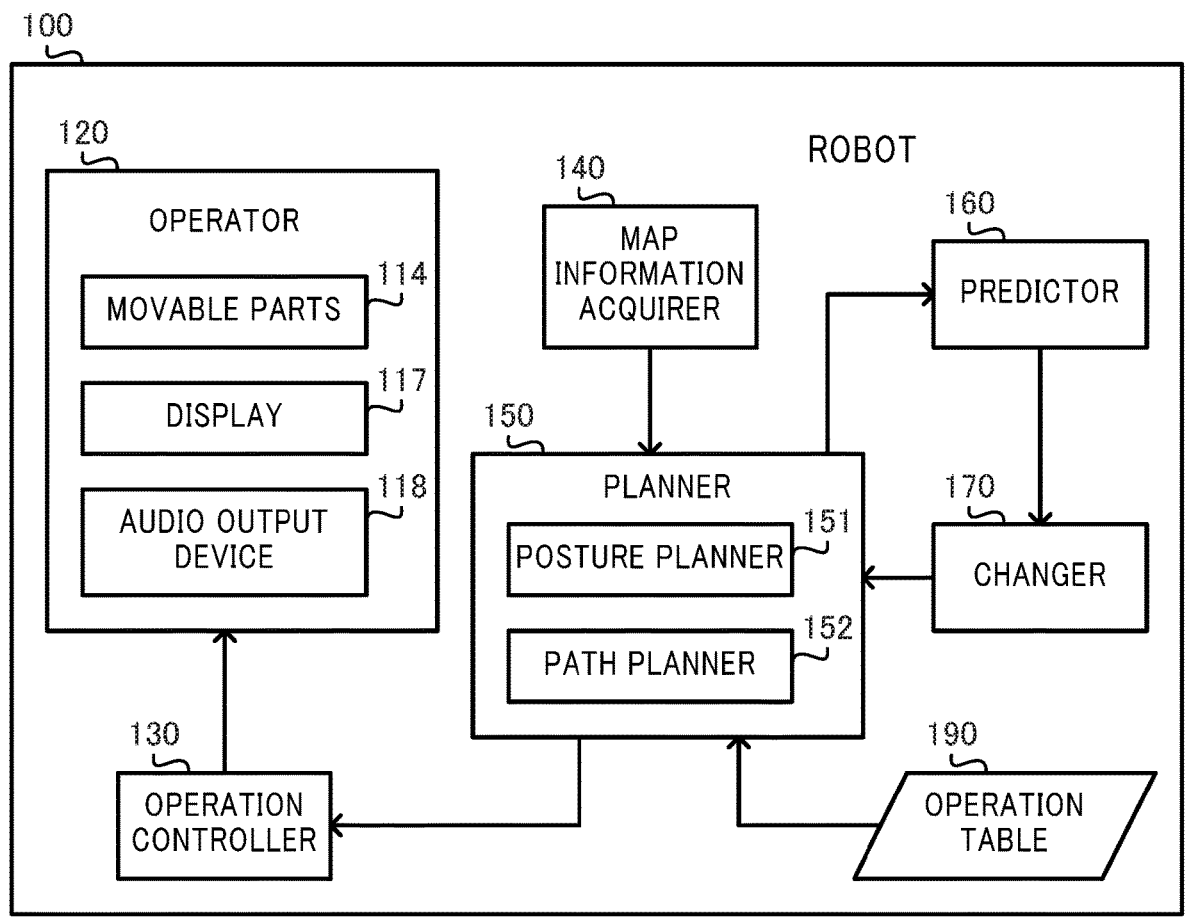
FIG. 3 is a block diagram illustrating a functional configuration of the robot according to the embodiment of the present disclosure.

Referring to FIG. 3, the following describes a functional configuration of the robot 100. As illustrated in FIG. 3, the robot 100 includes, in a functional sense, an operator 120, an operation controller 130, a map information acquirer 140, a planner 150, a predictor 160, and a changer 170. In the controller 110, the CPU functions as the individual components: the operation controller 130, the map information acquirer 140, the planner 150, the predictor 160, and the changer 170, by reading a program stored in the ROM into the RAM and executing the program to exert control.

The operator 120 is the part that operates the autonomous mobile apparatus, which is the robot 100. More specifically, the operator 120 includes the movable parts 114, the display 117, and the audio output device 118.

The operation controller 130 controls the operator 120 such that the robot 100 is caused to perform various predetermined operations. For example, the operation controller 130 changes the position, orientation, posture, or the like of the robot 100 by moving the head 101, the arms 107, and the legs 108, all of which are provided as the movable parts 114. The operation controller 130 moves the robot 100 by causing the legs 108 to move back and forth and side to side or by causing the wheels disposed on the legs 108 to rotate. In addition, the operation controller 130 displays an image showing a facial expression on the display 117. Furthermore, the operation controller 130 causes the robot 100 to have a conversation with a certain target by outputting a sound from the audio output device 118. In this way, the operation controller 130 allows the robot 100 to perform various operations. The operation controller 130 is implemented by the controller 110 collaborating with the driver 113, the movable parts 114, the display 117, and the audio output device 118.

The map information acquirer 140 acquires map information representing a map of surroundings of the robot 100. The map of surroundings of the robot 100 is an environment map expressing the state of surroundings of the place in which the robot 100 is located. For example, in the case where the robot 100 is located in a house or the like, the environment map indicates, for example, the layout of rooms in the house and the positions of pieces of furniture and equipment that are placed in the house. In the case where the robot 100 is located in an office, the environment map indicates, for example, the layout of the office and the positions of pieces of equipment and fixtures that are placed in the office.

Figure 4:
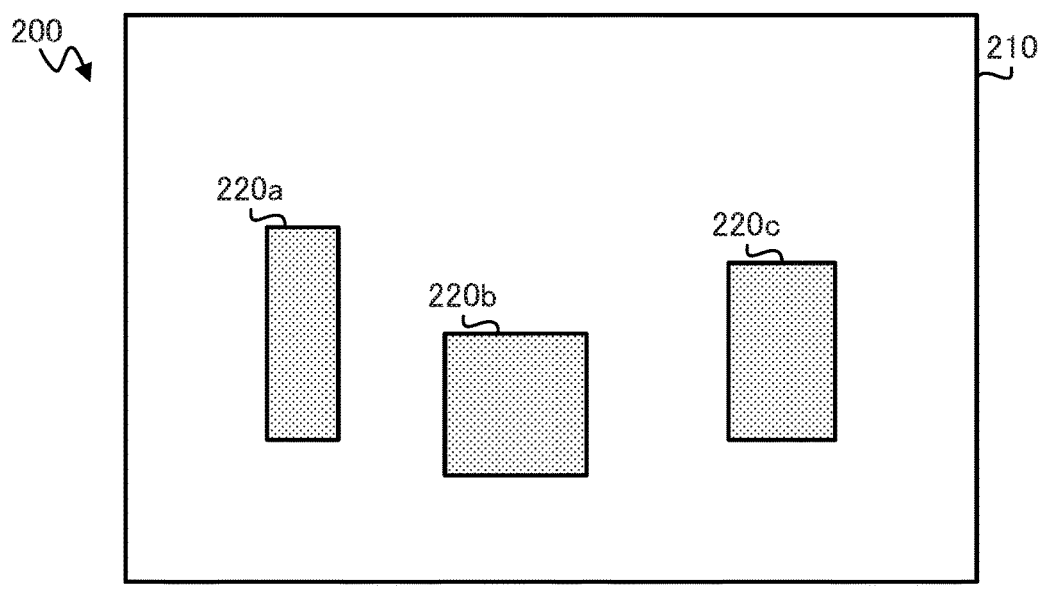
FIG. 4 illustrates an example of an environment map according to the embodiment of the present disclosure.

The map information acquirer 140 acquires map information indicating an environment map 200 like the example illustrated in FIG. 4. As depicted in FIG. 4, the environment map 200 is a two-dimensional map expressed by projecting a traveling space 210, which is a space through which the robot 100 can travel, onto a horizontal plane. The environment map 200 represents the size and shape of the traveling space 210 as well as the positional information of obstacles 220a to 220c in the traveling space 210. Note that the traveling space 210 represents, for example, the room in which the robot 100 is located, while the boundaries of the traveling space 210 represent, for example, doors or walls between rooms.

The obstacles 220a to 220c are objects that may prevent the robot 100 from traveling along a traveling path including, for example, pieces of furniture such as desk, chair, and rack, or electrical appliances such as television and heater. The environment map 200 contains information indicating the positions of the individual obstacles 220a to 220c, as positional information of the obstacles 220a to 220c, and the sizes and shapes of the individual obstacles 220a to 220c projected onto a horizontal plane. For ease of understanding, the obstacles 220a to 220c are hereinafter collectively called the obstacle 220 unless these obstacles should be distinguished from one another.

The map information acquirer 140 acquires such map information indicating the environment map 200, based on images acquired by the imager 115a that images surroundings of the robot 100. The map information acquirer 140 employs, for example, the simultaneous localization and mapping (SLAM) technique. SLAM is a technique used for drawing the environment map 200 while estimating the location of the autonomous mobile apparatus in real time. More specifically, when the robot 100 starts moving, the map information acquirer 140 estimates the current location of the robot 100 based on the moving distance and moving direction. While the robot 100 is moving, the imager 115a successively images surroundings of the robot 100, and the map information acquirer 140 draws the environment map 200 by identifying the positions of objects around the robot 100 based on the acquired images.

Alternatively, the map information may be created by a charging station, a cloud server, or any other external device located outside the robot 100. In this case, the map information acquirer 140 acquires, from such external device through the wireless communicator 116, the map information created by the external device. The map information acquirer 140 is implemented by the controller 110 collaborating with the imager 115a or the wireless communicator 116.

Referring back to the functional configuration of the robot 100 illustrated in FIG. 3, the planner 150 plans operations of the robot 100. An operation of the robot 100 is the one that the operator 120 is caused to perform by the operation controller 130. More specifically, the sensor 115, which functions as a state acquirer, acquires the state relating to the robot 100 via the various sensor devices included in the sensor 115. Then, the planner 150 plans an operation for expressing an emotion that is in accordance with the state acquired by the sensor 115. An emotion as used here refers to information expressed externally by the robot 100, such as delight, anger, sorrow, pleasure, surprise, excitement, or boring, with some facial expression or gesture. The state relating to the robot 100 includes the state of an environment surrounding the robot 100 such as temperature, sound, and time, the state of the inside of the robot 100 such as a remaining battery level in the battery 112 and presence or absence of any trouble, and the state of interaction with a certain target.

Operations of the robot 100 are predefined in an operation table 190 stored in the memory 111. The operation controller 130 refers to the operation table 190 to cause the operator 120 to perform any of a variety of operations in accordance with the state. The planner 150 is implemented by the controller 110 collaborating with the memory 111.

FIG. 5 shows examples of the operations defined in the operation table 190. As illustrated in FIG. 5, operations to be performed by the robot 100 are defined by condition in the operation table 190. For example, when the imager 115a detects that "a human being has been identified", the robot 100 performs the operation of "moving to the human being while expressing an interest". When the sound sensor 115b detects that "music is heard", the robot 100 performs the operation of "moving around happily". In this way, the operation table 190 defines operations to be performed by the robot 100 in accordance with a variety of possible states.

In accordance with the current state of the robot 100, the planner 150 determines whether any of the conditions defined in the operation table 190 is satisfied, and plans an operation associated with the satisfied condition. More particularly, as part of planning the operation of the robot 100, the planner 150 plans the posture and traveling path for the robot 100. The planner 150 has the functions of a posture planner 151 and of a path planner 152. Based on the map information acquired by the map information acquirer 140, the planner 150 plans the posture of the robot 100 and the traveling path for the robot 100 so that the robot 100 is prevented from coming into contact with the obstacle 220 while traveling along the traveling path.

The posture planner 151 plans the posture of the robot 100. The posture (pose) of the robot 100 is an attitude or stance of the body of the robot 100. The robot 100 can assume a variety of postures by changing, in accordance with the current state, the positions of the head 101, the arms 107, the legs 108, and so on. Note that a posture of the robot 100 can be regarded as a shape of the robot 100.

Figure 6A:
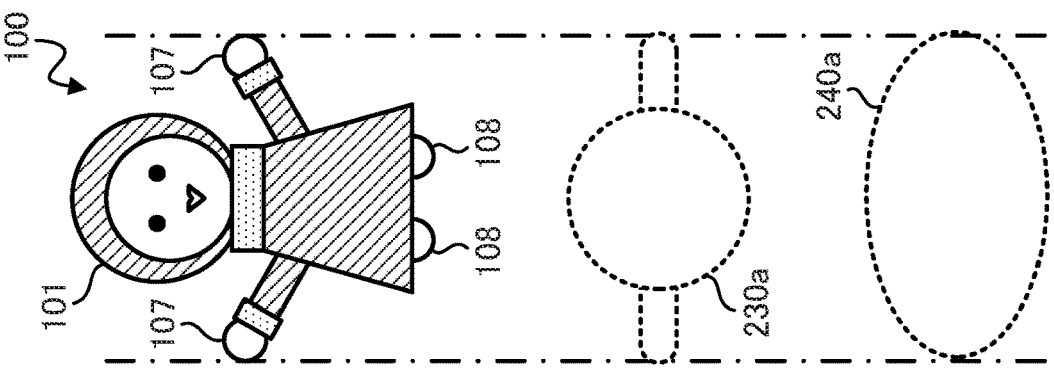
FIGS. 6A to 6D each illustrate an example of a posture that can be assumed by the robot according to the embodiment of the present disclosure.
Figure 6B:
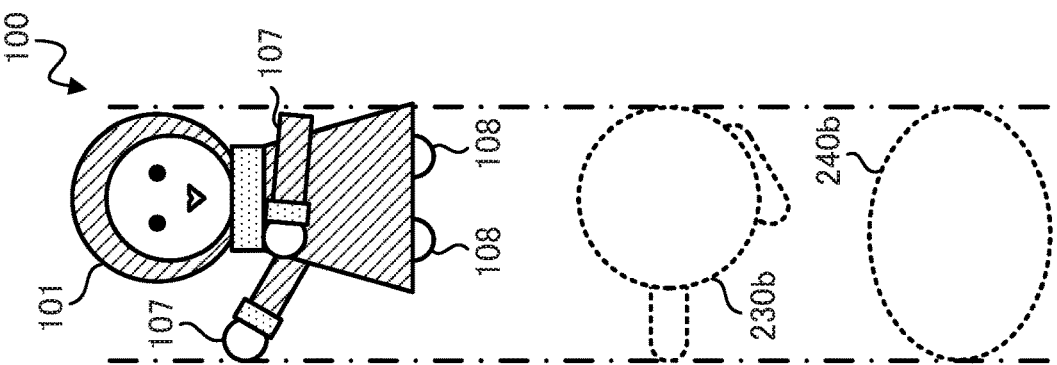
Figure 6C:
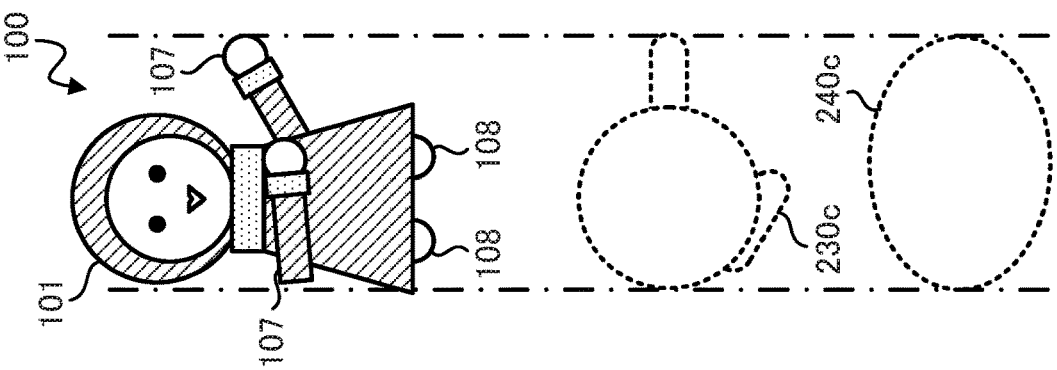
Figure 6D:
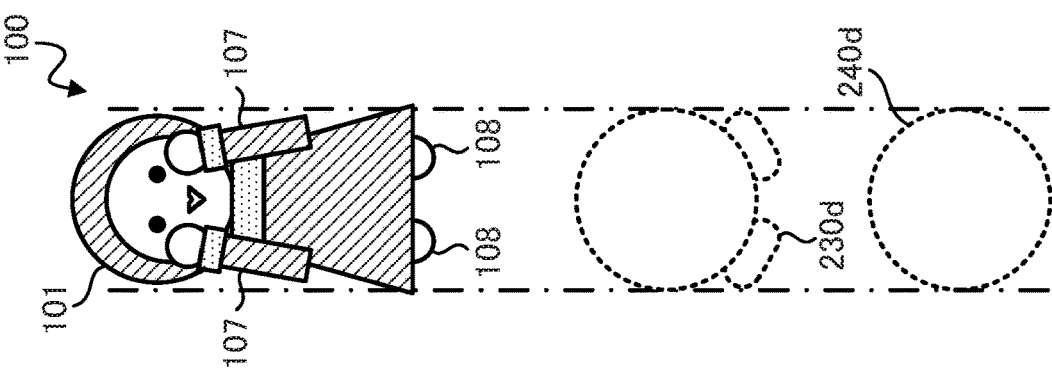

For example, the robot 100 can assume: a posture with both of the arms 107 opened as illustrated in FIG. 6A; a posture with the left arm 107 folded and the right arm 107 opened as illustrated in FIG. 6B; a posture with the right arm 107 folded and the left arm 107 opened as illustrated in FIG. 6C; and a posture with both of the arms 107 folded closer to the head 101 as illustrated in FIG. 6D. The operation controller 130 can cause the robot 100 to assume a plurality of different operations by moving the arms 107 as above. In addition to the postures depicted in FIGS. 6A to 6D, the operation controller 130 can cause the robot 100 to assume a variety of postures by moving the head 101, the arms 107, the legs 108, and so on in different ways.

As indicated by dotted lines in FIGS. 6A to 6D, the postures that can be assumed by the robot 100 are associated with projected regions 230a to 230d and with posture regions 240a to 240d, each region representing the region occupied by the robot 100 in a space for assuming the corresponding posture. The projected regions 230a to 230d each are obtained by projecting the outer shape of the robot 100 assuming the respective postures in FIGS. 6A to 6D onto a horizontal plane.

The posture regions 240a to 240d each are obtained by approximating (modeling) the respective projected regions 230a to 230d to an oval shape for simplicity. For example, the posture region 240a is in an oval shape having a larger width (a larger major diameter) because the robot 100 in the corresponding posture opens both of the arms 107. In contrast, the posture region 240d is in an oval shape having a smaller width (a smaller major diameter) because the robot 100 in the corresponding posture folds both of the arms 107. The posture regions 240a to 240d are used by the predictor 160 for predicting whether the robot 100 will come into contact with the obstacle 220, as described later.

As shown in FIG. 5, each of the operations defined in the operation table 190 is associated with at least one candidate for a posture for the robot 100 to perform the corresponding operation. For example, the operation of "moving to a human being while expressing an interest" is associated with a plurality of postures that can express the emotion of "having an interest". Another operation of "moving around happily" is associated with a plurality of postures that can express the emotion of "being happy". The posture planner 151 refers to the operation table 190 to select at least one posture from a plurality of the postures that are used for expressing an emotion and associated with the operation to be performed by the robot 100, thereby determining which posture the robot 100 should assume when performing the corresponding operation.

The path planner 152 plans a traveling path for the robot 100. The traveling path for the robot 100 is the path along which the robot 100 travels in the traveling space 210 when the operation to be performed by the robot 100 involves traveling. For example, when the robot 100 is to perform the operation of "moving to a human being while expressing an interest", the path planner 152 plans a traveling path for the robot 100 to "move toward a human being". When the robot 100 is to perform the operation of "moving around happily", the path planner 152 plans a traveling path for the robot 100 to "move around".

More specifically, the path planner 152 plans a traveling path based on the map information acquired by the map information acquirer 140. As seen in the example illustrated in FIG. 7, the path planner 152 may plan a traveling path 300a along which the robot 100, starting from the current position indicated by a dotted line, will pass through the space between the obstacle 220a and the obstacle 220b, and will further pass through the space between the obstacle 220a and a wall to return to the current position. The path planner 152 sets a starting point and an end point based on the current position of the robot 100 and on the operation to be performed by the robot 100. Then, based on the positional information of the obstacles 220a to 220c as indicated in the environment map 200, the path planner 152 plans the traveling path 300a running between the set starting and end points while avoiding the obstacles 220a to 220c.

Referring back to the functional configuration of the robot 100 illustrated in FIG. 3, the predictor 160 predicts whether the robot 100 will come into contact with the obstacle 220 when the robot 100 is traveling along the traveling path 300a planned by the path planner 152 while assuming the posture planned by the posture planner 151. The phase "contact with the obstacle 220" as used here means that any part of the robot 100 physically comes into contact with the obstacle 220 to the extent that the robot 100 is prevented from traveling normally, when the robot 100 is traveling along the traveling path 300a. Contact with the obstacle 220 may be described as a collision with the obstacle 220. The predictor 160 is implemented by the controller 110.

More specifically, the predictor 160 predicts whether the robot 100 will come into contact with the obstacle 220, based on the positional information of the obstacle 220 as included in the map information acquired by the map information acquirer 140 and on the regional information indicating the region of the robot 100 that is in the posture planned by the posture planner 151. The regional information indicating the region of the robot 100 refers to the information representing the size and shape of the space occupied by the robot 100 in the traveling space 210. For example, as the regional information indicating the region of the robot 100 that is in any of the postures illustrated in FIGS. 6A to 6D, the predictor 160 uses the posture regions 240a to 240d each being modeled in an oval shape.

Figure 8:
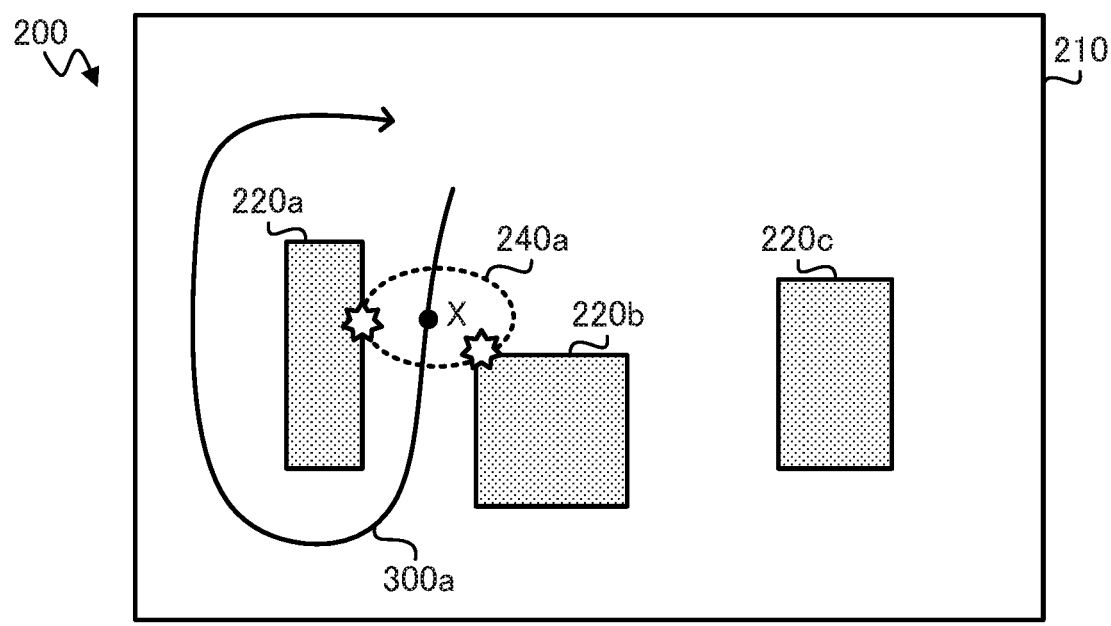
FIG. 8 illustrates an example in which the robot according to the embodiment of the present disclosure comes into contact with an obstacle.

As an example, the following describes the case where the robot 100 travels, as illustrated in FIG. 8, along the traveling path 300a while assuming the posture of opening both of the arms 107 as in FIG. 6A. The predictor 160 makes a comparison between the breadth of the posture region 240a indicated by a dotted line in FIG. 8 and the distance from the first obstacle 220a to the second obstacle 220b. The predictor 160 thus predicts whether the robot 100 can pass through the space between the first obstacle 220a and the second obstacle 220b. The breadth of the posture region 240a as used here means the width of the posture region 240a measured on a horizontal plane along a direction perpendicular to the traveling direction of the robot 100. In the example illustrated in FIG. 8, the breadth of the posture region 240a is greater than the distance between the two obstacles 220a and 220b. Thus, the predictor 160 predicts that the robot 100 will come into contact with the first obstacle 220a and the second obstacle 220b at a contact point X. The process of predicting whether the robot 100 will come into contact with the obstacle 220 is carried out by the predictor 160 before the robot 100 starts traveling.

Figure 9:
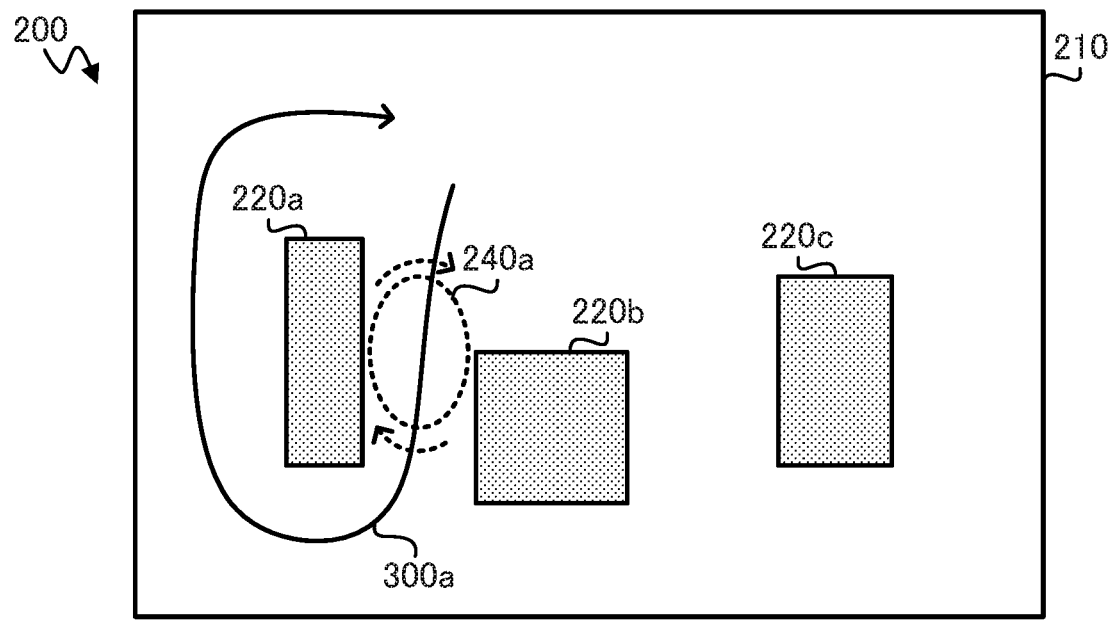
FIG. 9 illustrates an example in which the robot according to the embodiment of the present disclosure rotates to avoid contact with the obstacle.

When the predictor 160 predicts that the robot 100 will come into contact with the obstacle 220, the predictor 160 further predicts whether the robot 100 will still come into contact with the obstacle 220 after the robot 100 is rotated. Rotation of the robot 100 here means changing the orientation of the robot 100 on a horizontal plane. For example, as illustrated in FIG. 9, the predictor 160 rotates the posture region 240a at the contact point X on a horizontal plane. In this way, the predictor 160 predicts whether the breadth of the robot 100 can be made smaller than the distance between the two obstacles 220a and 220b.

With reference to the example in FIG. 9, when the posture region 240a is rotated about 90 degrees so that the minor axis of the posture region 240a is perpendicular to the traveling direction of the robot 100, the breadth of the posture region 240a is smaller than the distance between the two obstacles 220a and 220b. Thus, the predictor 160 predicts that the robot 100, when rotated, can avoid the contact at the contact point X. In this way, with respect to every point at which the robot 100 will come into contact with the obstacle 220 on the traveling path 300a, the predictor 160 determines whether the robot 100, when rotated to change its orientation, can avoid contact with the obstacle.

Referring back to the functional configuration of the robot 100 illustrated in FIG. 3, when the predictor 160 predicts that the robot 100 will come into contact with the obstacle 220, the changer 170 changes the posture that has been planned by the posture planner 151. More specifically, when the predictor 160 predicts that the robot 100 will come into contact with the obstacle 220 despite rotation of the robot 100, the changer 170 changes the posture planned by the posture planner 151 so that the robot 100 can travel along the traveling path 300a without coming into contact with the obstacle 220. On the other hand, when the predictor 160 predicts that the robot 100, if rotated, will not come into contact with the obstacle 220, the changer 170 keeps the posture planned by the posture planner 151 unchanged. The changer 170 is implemented by the controller 110.

More specifically, the changer 170 changes the posture planned by the posture planner 151 into a posture in which the arm 107 or any of the other movable parts 114 is brought closer to the torso 102. In this way, the changer 170 makes both the projected region 230 and the posture region 240 smaller. For example, if the planned posture is the one illustrated in FIG. 6A, which shows that both of the arms 107 are opened, the posture is changed so that movable parts 114 are brought closer to the torso 102 like any one of those illustrated in FIGS. 6B to 6D, which show that at least one of the arms 107 is folded on the torso 102. In this way, the changer 170 changes the posture planned by the posture planner 151 to a posture having a smaller width so that the robot 100 will be prevented from coming into contact with the obstacle 220.

More particularly, when the predictor 160 predicts that the robot 100 will come into contact with the obstacle 220, the changer 170 changes the posture planned by the posture planner 151 to any one of a plurality of postures predetermined as candidates for expressing an emotion. The plurality of postures predetermined as candidates for expressing an emotion refers to the plurality of postures associated with an operation to be performed by the robot 100, as defined in the operation table 190. For example, in the operation table 190 shown in FIG. 5, the operation of "moving to a human being while expressing an interest" is associated with a plurality of postures including Posture A and Posture B. Thus, when the robot 100 is going to perform this operation, the changer 170 narrows candidates down to these postures, from which the changer 170 selects as a post-change new posture a posture having a smaller width than the planned posture.

The operation controller 130 drives the legs 108 so that the robot 100 autonomously travels along the traveling path 300a that has been planned by the path planner 152. If the posture planned by the posture planner 151 has been changed by the changer 170, the operation controller 130 causes the robot 100 to assume the post-change new posture as well as causing the robot 100 to travel along the traveling path 300a. In contrast, if the posture planned by the posture planner 151 is kept unchanged by the changer 170, the operation controller 130 causes the robot 100 to travel along the traveling path 300a while causing the robot 100 to assume the planned posture. In the case where it is predicted that the robot 100, if rotated at the contact point X, can avoid contact with the obstacle 220, the operation controller 130 causes the robot 100 to rotate by a specified angle at the contact point X while allowing the robot 100 to travel along the traveling path 300a. In this way, the operation controller 130 causes the robot 100 to perform an operation for expressing an emotion that is in accordance with the current state while preventing the robot 100 from coming into contact with the obstacle 220.

Furthermore, in the case where the predictor 160 predicts that the robot 100 will come into contact with the obstacle 220 and that the robot 100 will still come into contact with the 220 despite change of the posture planned by posture planner 151, the changer 170 changes the traveling path 300a that has been planned by the path planner 152. In other words, if the predictor 160 concludes that it is still predicted that the robot 100 will come into contact with the obstacle 220 after the posture of the robot 100 is changed to any one of a plurality of postures associated with the operation to be performed by the robot 100, the changer 170 changes the traveling path instead of changing the posture of the robot 100.

Figure 10:
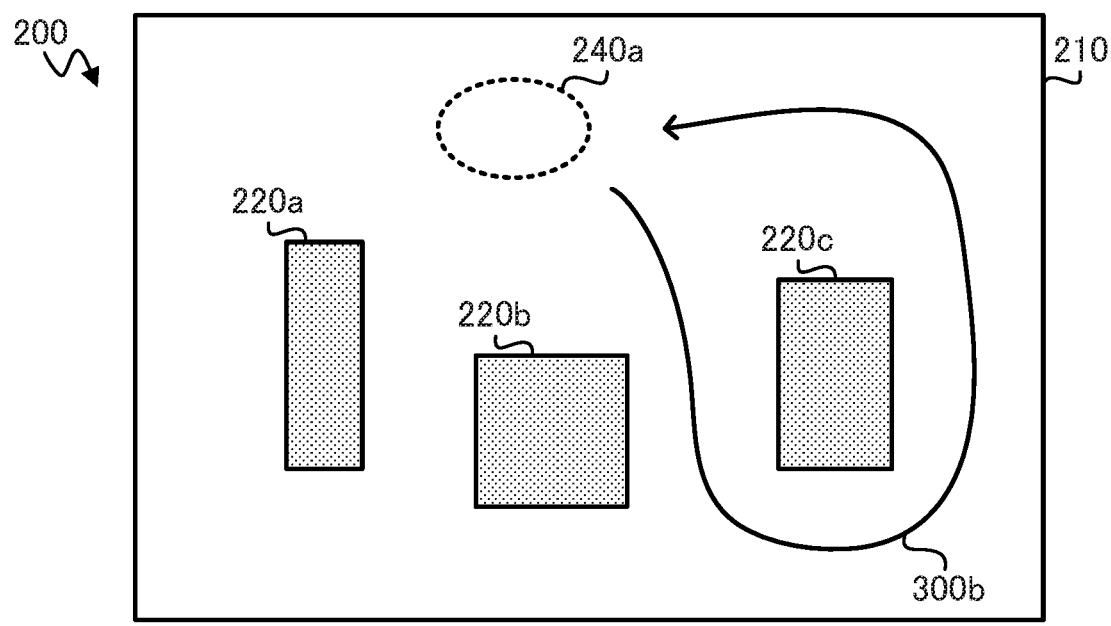
FIG. 10 illustrates an example in which the traveling path for the robot according to the embodiment of the present disclosure has been changed.

More specifically, when it is predicted that the robot 100 will fail to travel all along the traveling path 300a from the starting point to the end point despite changing the posture of the robot 100 to any possible posture, the changer 170 changes the traveling path 300a planned by the path planner 152 to, for example, another traveling path 300b illustrated in FIG. 10. The traveling path 300b is a path running between the obstacles 220b and 220c and further running between the obstacle 220c and a wall to return to the current position. In this way, the changer 170 changes the planned traveling path by referring to the environment map 200 to search for another path that allows the robot 100 to travel from the starting point to the end point.

When the changer 170 has changed the traveling path, the predictor 160 predicts whether the robot 100 will come into contact with the obstacle 220 when the robot 100 is traveling along the new traveling path resulting from the change made by the planner 170 while assuming the posture planned by the posture planner 151. For example, when the changer 170 changes the traveling path for the robot 100 from the traveling path 300a to the traveling path 300b, the predictor 160 determines, based on the positional information of the obstacles 220b and 220c and on the regional information of the robot 100, whether the robot 100 can travel all along the traveling path 300b from the starting point to the end point without coming into contact with the obstacles 220b and 220c.

When the predictor 160 predicts that the robot 100 will not come into contact with the obstacle 220 as a result of changing the traveling path, the operation controller 130 controls the operator 120 so as to cause the robot 100 to assume the posture planned by the posture planner 151 and to travel along the new traveling path resulting from by the change made by the changer 170. In this way, the operation controller 130 causes the robot 100 to perform an operation for expressing an emotion that is in accordance with the current state while preventing the robot 100 from coming into contact with the obstacle 220.

On the other hand, when the predictor 160 predicts that the robot 100 will come into contact with the obstacle 220, the changer 170 further changes the traveling path to another path and repeats the same steps. When the predictor 160 predicts that the robot 100 cannot avoid contact with the obstacle 220 after the traveling path is changed to any possible path, the planner 150 may stop planning traveling of the robot 100. In other words, the planner 150 may plan an operation that does not involve traveling of the robot 100 for the robot 100 to express an emotion that is in accordance with the current state, by, for example, causing the robot 100 to assume a specified posture or to rotate at the current location.

Flows of processes executed on the robot 100 as configured above will now be described with reference to the flowcharts in FIGS. 11 and 12.

Figure 11:
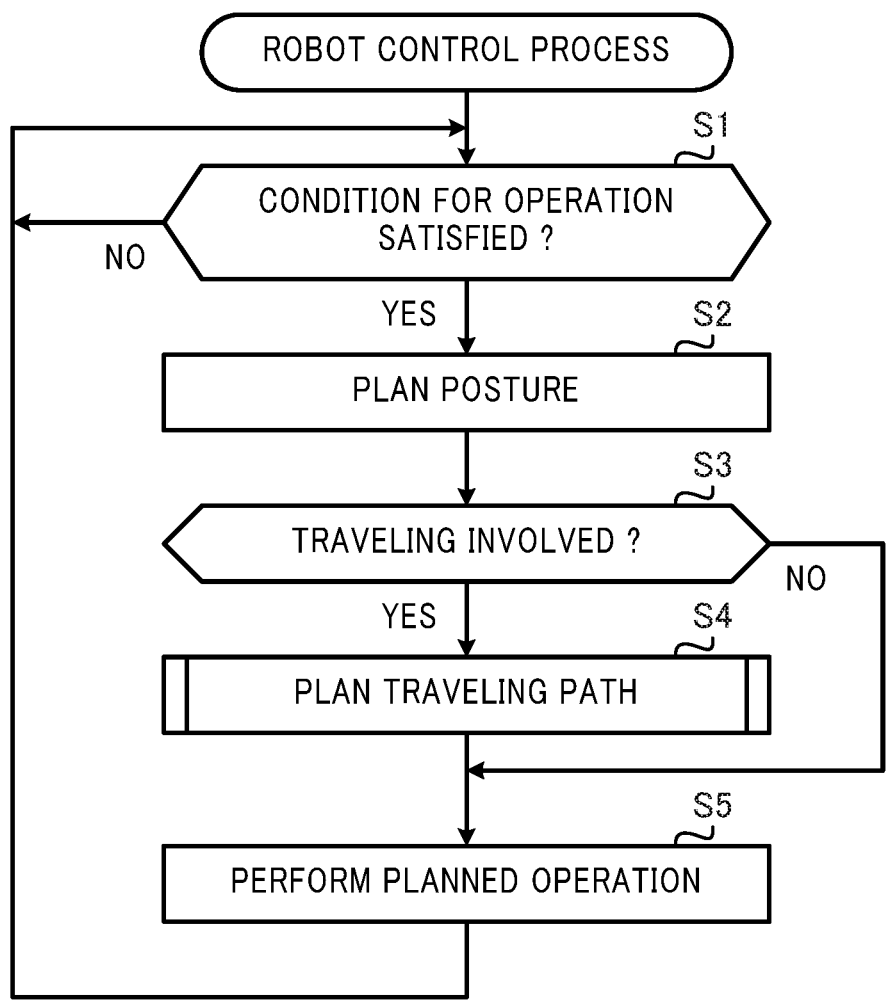
FIG. 11 is a flowchart illustrating a flow of a robot control process carried out by the robot according to the embodiment of the present disclosure.

The robot control process illustrated in FIG. 11 starts when the robot 100 becomes ready for normal operation, that is, when the robot 100 is powered on and the battery 112 is charged. The following description assumes that the controller 110 has already acquired, prior to the robot control process shown in FIG. 11, the map information that includes the environment map 200 indicating surroundings of the robot 100 by virtue of functions of the map information acquirer 140.

When the robot control process is started, the controller 110 determines whether any condition for operating the robot 100 is satisfied (step S1). More specifically, the controller 110 determines whether any of a plurality of conditions for operating the robot 100 defined in the operation table 190 is satisfied.

If none of the conditions for operating the robot 100 is satisfied (NO in step S1), the controller 110 suspends the processing in step S1 and waits until any of the conditions for operating the robot 100 is satisfied.

When any of the conditions for operating the robot 100 is satisfied (YES in step S1), the controller 110, which now functions as the posture planner 151, plans a posture of the robot 100 in accordance with the satisfied condition (step S2). More specifically, the controller 110 refers to the operation table 190 to select at least one posture needed for the robot 100 to perform the operation corresponding to the satisfied condition.

Once the posture of the robot 100 is planned, the controller 110 determines whether the operation corresponding to the satisfied condition involves traveling (step S3). For example, if the operation corresponding to the satisfied condition is "moving to a human being while expressing an interest" or "moving around happily" as defined in the operation table 190 in FIG. 5, it is determined that the operation involves traveling. On the other hand, if the operation corresponding to the satisfied condition is, for example, "looking around surprisingly" or "giving a joyful look", it is determined that the operation does not involve traveling. In this way, the controller 110 determines whether the robot 100 needs to travel in order for the robot 100 to perform an operation corresponding to the satisfied condition.

When the controller 110 determines that the operation corresponding to the satisfied condition involves traveling (YES in step S3), the controller 110 plans a traveling path for the robot 100 (step S4). Referring to the flowchart in FIG. 12, the following describes in detail the process of planning a traveling path in step S4.

Figure 7:
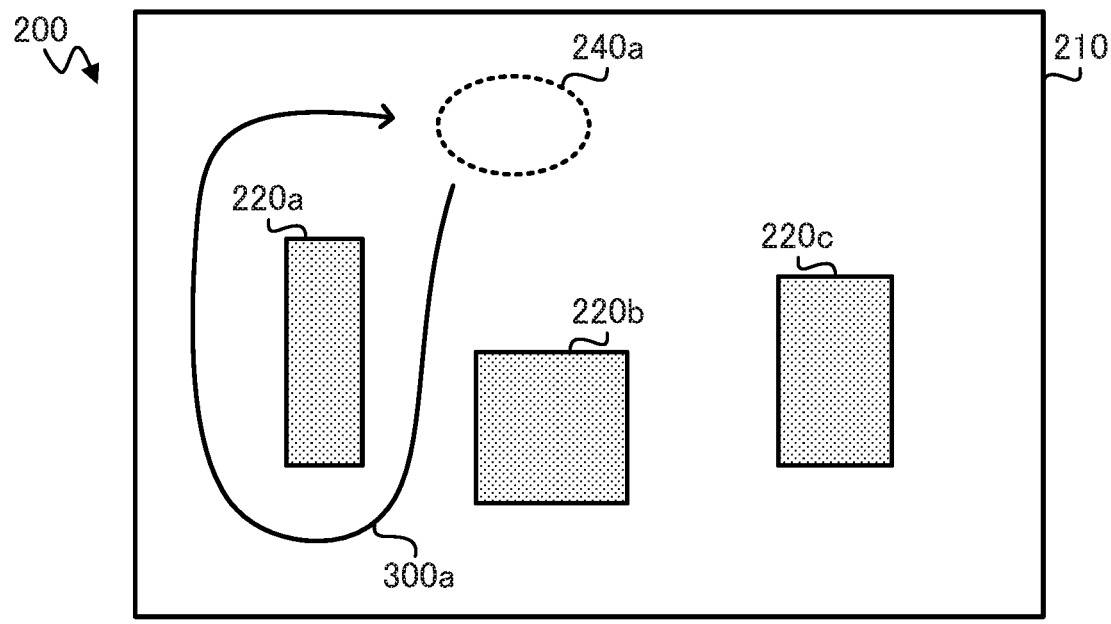
FIG. 7 illustrates an example of a traveling path for the robot according to the embodiment of the present disclosure.
Figure 12:
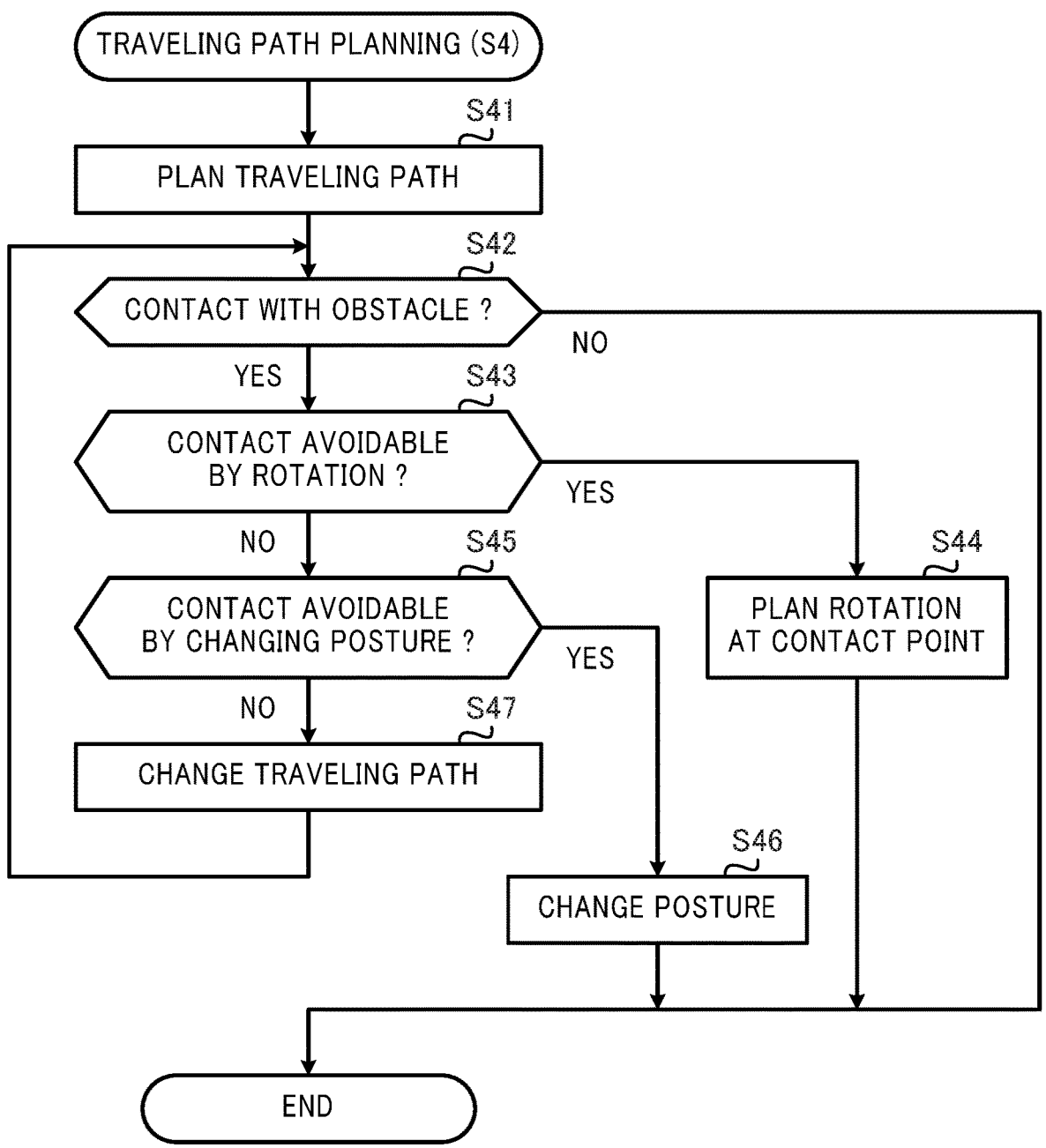
FIG. 12 is a flowchart illustrating a flow of a traveling path planning process carried out by the robot according to the embodiment of the present disclosure.

When the process of planning a traveling path illustrated in FIG. 12 is started, the controller 110, which now functions as the path planner 152, plans a traveling path for the robot 100 in accordance with the satisfied condition (step S41). More specifically, the controller 110 plans a traveling path for the robot 100 to perform an operation corresponding to the satisfied condition, such as the traveling path 300a passing through the space between the two obstacles 220a and 220b, as illustrated in FIG. 7.

Once a traveling path for the robot 100 is planned, the controller 110, which now functions as the predictor 160, predicts whether the robot 100 will come into contact with the obstacle 220 when the robot in the planned posture is traveling along the traveling path that has been planned (step S42). More specifically, the controller 110 determines whether the robot 100 will come into contact with any of the obstacles 220a to 220c at any point on the planned traveling path 300a running from the starting point to the end point, based on, for example, the positional information of the obstacles 220a to 220c and on the posture region 240a of the robot 100 as illustrated in FIG. 8.

When the controller 110 predicts that the robot 100 will come into contact with the obstacle 220 (YES in step S42), the controller 110 determines, in the first place, whether the robot 100 can avoid contact with the obstacle 220 if the robot 100 is rotated (step S43). More specifically, the controller 110 determines whether the breadth of the robot 100 on the traveling path 300a can be adjusted so that the robot 100 avoids contact with the obstacles 220a and 220b, if, for example, the posture region 240a is rotated at the contact point X in the environment map 200 as illustrated in FIG. 9.

When the controller 110 predicts that the robot 100, if rotated, can avoid contact with the obstacle 220 (YES in step S43), the controller 110 plans rotating the robot 100 at the point of contact with the obstacle 220 (step S44). In other words, the controller 110 plans rotating the robot 100 at the point where the robot 100 is expected to come into contact with the obstacle 220, by an angle wide enough to avoid contact with the obstacle 220.

On the other hand, when the controller 110 determines that the robot 100 cannot avoid contact with the obstacle 220 despite rotation of the robot 100 (NO in step S43), the controller 110 determines, in the second place, whether the robot 100 can avoid contact with the obstacle 220 by changing the posture of the robot 100 (step S45). More specifically, the controller 110 determines whether the robot 100 can avoid contact with the obstacle 220 if the posture planned in step S2 is changed to any one of a plurality of postures for expressing an emotion corresponding to the condition satisfied in step S1.

When the controller 110 determines that the robot 100 can avoid contact with the obstacle 220 by changing the posture (YES in step S45), the controller 110, which now functions as the changer 170, changes the planned posture to another posture in which the robot 100 can avoid contact with the obstacle 220 (step S46).

On the other hand, when the controller 110 determines that the robot 100 cannot avoid contact with the obstacle 220 despite changing to another posture (NO in step S45), the controller 110 changes, in the third place, the traveling path planned in step S41 (step S47). In other words, when the controller 110 determines that the robot 100 in a new posture still fails to avoid contact with the obstacle 220 while traveling along the traveling path planned in step S41, the controller 110 changes the traveling path instead of changing the posture.

After the traveling path is changed, the controller 110 returns the processing to step S42. Then, the controller 110 carries out the processing from step S42 to step S47 with respect to the post-change new traveling path. More specifically, the controller 110 predicts whether the robot 100 assuming the posture planned in step S2 and traveling along the post-change new traveling path will come into contact with the obstacle 220. When the controller 110 predicts that the robot 100 will come into contact with the obstacle 220, the controller 110 rotates the robot 100, changes the posture, or changes the traveling path. In this way, the controller 110 searches for a method of traveling to the destination while avoiding contact with the obstacle 220 in order that the robot 100 performs an operation corresponding to the satisfied condition.

On the other hand, when it is predicted in step S42 that the robot 100 will not come into contact with the obstacle (NO in step S42), neither the posture of the robot 100 nor the traveling path needs to be changed. Then, the controller 110 skips the processing from step S43 to step S47. In other words, the controller 110 keeps both the posture planned in step S2 and the traveling path planned in step S41 unchanged and selects the posture and the traveling path as final ones. The traveling path planning process illustrated in FIG. 12 is now finished.

Referring back to the flowchart in FIG. 11, when a traveling path has been planned in step S4, the controller 110, which now functions as the operation controller 130, causes the robot 100 to perform the planned operation (step S5). More specifically, the controller 110 causes the robot 100 to travel along the planned traveling path while causing the robot 100 to assume the planned posture. In the case where rotation was planned in step S44, the controller 110 causes the robot 100 to rotate by the planned angle at the planned point to change the orientation of the robot 100. In the case where the posture was changed in step S46, the controller 110 causes the robot 100 to assume the post-change new posture. In the case where the traveling path was changed in step S47, the controller 110 causes the robot 100 to travel along the post-change new traveling path.

When the controller 110 determines that the operation corresponding to the satisfied condition does not involve traveling (NO in step S3), the controller 110 skips the processing in step S4. Then, the controller 110 causes the robot 100 to perform the planned operation in step S5. More specifically, the controller 110 causes the robot 100 to perform the operation that involves no traveling by causing the robot 100 to assume the posture planned in step S2.

After causing the robot 100 to perform the operation, the controller 110 returns the processing to step S1 and determines whether any of a plurality of conditions defined in the operation table 190 is satisfied. When any of the conditions is satisfied, the controller 110 carries out the processing from step S2 to step S5. In this way, the controller 110 causes the robot 100 to perform the operation corresponding to the satisfied condition while preventing the robot 100 from coming into contact with the obstacle 220.

As described above, the robot 100 according to the present embodiment determines whether the robot 100 will come into contact with the obstacle 220 when the robot 100 is traveling along the planned traveling path 300a while assuming the planned posture. When it is predicted that the robot 100 will come into contact with the obstacle 220, the robot 100 changes the planned posture to avoid contact with the obstacle 220. As a result, the robot 100 can avoid contact with the obstacle 220 owing to the process of changing the posture of the robot 100, which requires a relatively small amount of computation. Therefore, the robot 100 is allowed to travel while efficiently avoiding contact with the obstacle 220. In particular, when performing an operation for expressing an emotion that is in accordance with the current state, the robot 100 according to the present embodiment selects a new posture from a plurality of candidate postures for performing the operation. Therefore, the robot 100 can avoid contact with the obstacle 220 while making a natural gesture.

(Variations)

Embodiments of the present disclosure have been described above, but these embodiments are examples only and the scope of present disclosure is not limited thereto. In other words, the present disclosure allows for various applications and every possible embodiment is included in the scope of the present disclosure.

For example, in the foregoing embodiment, in the case where the predictor 160 predicts that the robot 100 will come into contact with the obstacle 220, the changer 170 changes the posture planned by the posture planner 151, and then the robot 100 starts traveling along the traveling path 300a planned by the path planner 152. However, according to the present disclosure, in the case where the predictor 160 predicts that the robot 100 will come into contact with the obstacle 220, the changer 170 may change the posture of the robot 100 after the robot 100 assuming the posture planned by the posture planner 151 starts traveling along the traveling path 300a planned by the path planner 152. In other words, the operation controller 130 allows the robot 100 to assume the posture planned by the posture planner 151 and to travel along the traveling path 300a until the robot 100 arrives at the contact point X. Then, immediately before the robot 100 arrives at the contact point X, the changer 170 changes the posture of the robot 100 to another posture in which the robot 100 can avoid contact with the obstacle 220. As a result, the robot 100 can avoid contact with the obstacle 220 with more focus on the contact point.

In this case, after the robot 100 passes by the contact point X, the changer 170 may change the posture of the robot 100 to the original posture that was planned by the posture planner 151. In addition, if the posture planned by the posture planner 151 is important for the operation being performed by the robot 100, the operation controller 130 may cause the robot 100 to move to the contact point X more slowly so that the robot 100 can be in the posture for a longer time.

Furthermore, the predictor 160 may predict whether the robot 100 will come into contact with the obstacle 220 after the robot 100 in the posture planned by the posture planner 151 starts traveling along the traveling path 300a planned by the path planner 152. In other words, when the robot 100 is in the midst of traveling, the predictor 160 may predict, as appropriate, whether the robot 100 assuming the current posture will come into contact with the obstacle 220. Then, when the predictor 160 predicts that the robot 100 will come into contact with the obstacle 220, the changer 170 may change the posture of the robot 100 to another posture in which the robot 100 can avoid contact with the obstacle 220. In this way, the process of predicting the possibility of contact, which requires a relatively large amount of computation, may be performed while the robot 100 is traveling. Thus, the robot 100 can start traveling in a shorter time, which enables the robot 100 to perform an operation more quickly.

In the foregoing embodiment, the predictor 160 uses, as the regional information indicating a region occupied by the robot 100 in the traveling space 210, the posture regions 240a to 240d each modeling the respective projected regions 230a to 230d in the form of an oval. However, according to the present disclosure, the form of an oval is not restrictive, and the predictor 160 may use the posture regions 240a to 240d each modeling the region of the robot 100 in the form of a circle, a rectangular, or the like. Instead of using the posture regions 240a to 240d, the predictor 160 may use, as the regional information, some other information representing the region of the robot 100 more accurately, such as the projected regions 230a to 230d.

In the foregoing embodiment, the map information acquirer 140 acquires, as the environment map 200, a two-dimensional map expressed by projecting the traveling space 210, which is a space through which the robot 100 can travel, onto a horizontal plane. However, according to the present disclosure, the map information acquirer 140 may acquire, as the environment map 200, a three-dimensional map expressing the inside of the traveling space 210 three-dimensionally. In this case, the predictor 160 three-dimensionally compares the position, size, and shape of the obstacle 220 expressed in the three-dimensional environment map 200 with the region of the robot 100 in the posture planned by the posture planner 151. In other words, the predictor 160 predicts whether the robot 100 will come into contact with the obstacle 220, taking into consideration not only the information pertaining to the width direction of a horizontal plane but also the information pertaining to the height direction.

In the foregoing embodiment, the robot 100 includes functions of the changer 170, which is configured to change the posture or traveling path planned by the planner 150 when it is predicted that the robot 100 will come into contact with the obstacle 220. However, according to the present disclosure, the robot 100 may not necessarily include the functions of the changer 170. In other words, based on the state of the robot 100 and on the map information, the planner 150 may plan, during a single process, the posture and traveling path that ensure that the robot 100 is prevented from coming into contact with the obstacle 220 when the autonomous mobile apparatus is traveling along the traveling path.

In the foregoing embodiment, the robot 100 is a robot mimicking a human being. However, the robot 100 according to the present disclosure is not limited to a shape mimicking a human being but may be in any shape. For example, the robot 100 according to the present disclosure may be a robot mimicking an animal (pet) in appearance such as dog, cat, mouse, or rabbit.

In the foregoing embodiment, the display 117 is disposed at the eye 104 while the imager 115a is disposed at the mouth 105. However, according to the present disclosure, the display 117 may be disposed at a place other than the eye 104 while the imager 115a may be disposed at a place (the nose, for example) other than the mouth 105.

In the foregoing embodiment, the operator 120 operates the robot 100 by moving the movable parts 114 driven by a driving member such as a motor or actuator. However, according to the present disclosure, the body of the robot 100 may be made of a balloon, for example, and the operator 120 may operate the robot 100 by inflating the balloon with a pump to change its shape.

The foregoing embodiment describes the autonomous mobile apparatus taking the robot 100 as an example. However, the autonomous mobile apparatus according to the present disclosure is not limited to the robot 100 mimicking a human being or an animal but may be a cleaner or vehicle capable of autonomously moving.

In the case where the robot 100 is an apparatus not mimicking a human being or an animal, the changes in posture of the robot 100 as described in the foregoing embodiment can be replaced with changes in shape of the autonomous mobile apparatus. More specifically, based on the map information acquired by the map information acquirer 140, the posture planner 151 plans the shape of the autonomous mobile apparatus so that the autonomous mobile apparatus is prevented from coming into contact with the obstacle 220 while traveling along the traveling path. Then, the operation controller 130 controls the operator 120 to cause the autonomous mobile apparatus to travel along the traveling path planned by the path planner 152 while causing the autonomous mobile apparatus to assume the shape planned by the posture planner 151.

In the foregoing embodiment, the CPU in the controller 110 functions as the individual components illustrated in FIG. 3 by executing programs stored in the ROM. However, according to the present disclosure, the controller 110 may include, instead of the CPU, special-purpose hardware such as an application-specific integrated circuit (ASIC), a field-programmable gate array (FPGA), or any of various control circuits, and such special-purpose hardware may function as the individual components illustrated in FIG. 3. In this case, functions of the individual components may be implemented by separate pieces of the hardware, or all the functions may be collectively implemented by a single piece of the hardware. Alternatively, some of the functions of the individual components may be implemented by the special-purpose hardware, and some other functions may be implemented by software or firmware. Note that entities that include such special-purpose hardware and CPU and execute the individual functions may be collectively called a processor.

The functions according to the present disclosure can be provided in the form of a robot preconfigured to implement these functions, and furthermore, an existing information processing apparatus or the like can also function as the robot according to the present disclosure by applying a program to the autonomous mobile apparatus. That is, an existing information apparatus or the like can function as the robot according to the present disclosure by applying a program for implementing the individual functional components of the robot 100 exemplified in the foregoing embodiment in such a way that the program can be executed by the CPU or the like that controls the existing information processing apparatus or the like.

Such program may be applied by using any method. For example, the program may be stored in a computer-readable storage medium such as a flexible disk, a compact disc (CD)-ROM, a digital versatile disc (DVD)-ROM, or a memory card to be applied. In addition, the program may be superimposed on a carrier wave to be applied via the Internet or any other communication medium. For example, the program may be posted to a bulletin board system (BBS) on a communication network to be distributed. In this case, the information processing apparatus may be configured so that the above-described processes can be executed by starting and executing the program under control of an operating system (OS) as with other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An autonomous mobile apparatus comprising:
a sensor configured to acquire a state relating to the autonomous mobile apparatus; and
a processor configured to:
acquire map information including positional information of an obstacle,
plan, based on the acquired state and the acquired map information, a shape of the autonomous mobile apparatus and a traveling path of the autonomous mobile apparatus, to cause the autonomous mobile apparatus to express an emotion and to avoid contact between the autonomous mobile apparatus and the obstacle when the autonomous mobile apparatus is traveling along the traveling path, and
cause the autonomous mobile apparatus to autonomously travel along the planned traveling path while assuming the planned shape,
wherein the autonomous mobile apparatus is configured as a robot mimicking a human being or an animal.

2. The autonomous mobile apparatus according to claim 1, wherein the processor is configured to:
plan, based on the acquired state, an emotion expression shape as the shape of the autonomous mobile apparatus, the emotion expression shape being a shape for expressing the emotion of the autonomous mobile apparatus,
predict, based on the positional information of the obstacle as included in the acquired map information, whether the autonomous mobile apparatus assuming the planned emotion expression shape will come into contact with the obstacle when travelling along the planned traveling path,
change, in a case where the processor predicts that the autonomous mobile apparatus will come into contact with the obstacle, the planned emotion expression shape to avoid the contact between the autonomous mobile apparatus and the obstacle when the autonomous mobile apparatus is traveling along the traveling path, and
cause the autonomous mobile apparatus to autonomously travel along the planned traveling path while assuming the changed emotion expression shape.

3. The autonomous mobile apparatus according to claim 2, wherein the processor is configured to change, in a case where the processor predicts that the autonomous mobile apparatus will come into contact with the obstacle, the planned emotion expression shape to any one of a plurality of shapes that are candidates for the emotion expression shape.

4. The autonomous mobile apparatus according to claim 2, wherein the processor is configured to:
further predict, in a case where the processor predicts that the autonomous mobile apparatus will come into contact with the obstacle, whether the autonomous mobile apparatus will come into contact with the obstacle even when being rotated; and
change, in a case where the processor predicts that the autonomous mobile apparatus will come into contact with the obstacle even when being rotated, the planned emotion expression shape.

5. The autonomous mobile apparatus according to claim 2, wherein the processor is configured to:
change the planned traveling path in a case where the processor predicts that the autonomous mobile apparatus will come into contact with the obstacle and that the autonomous mobile apparatus will still come into contact with the obstacle even when the planned emotion expression shape is changed; and
cause the autonomous mobile apparatus to autonomously travel along the changed traveling path while assuming the planned emotion expression shape.

6. The autonomous mobile apparatus according to claim 2, further comprising:
a torso; and
a movable part capable of being driven relative to the torso,
wherein the processor is configured to change the planned emotion expression shape to a shape in which the movable part is brought closer to the torso.

7. The autonomous mobile apparatus according to claim 2, wherein the processor is configured to predict whether the autonomous mobile apparatus will come into contact with the obstacle, based on the positional information of the obstacle as included in the acquired map information and on regional information indicating a region of the autonomous mobile apparatus when assuming the planned emotion expression shape.

8. The autonomous mobile apparatus according to claim 7, wherein the regional information is a projected region of the autonomous mobile apparatus projected onto a horizontal plane.

9. The autonomous mobile apparatus according to claim 8, wherein the processor is configured to change the planned emotion expression shape so that the projected region is made smaller.

10. The autonomous mobile apparatus according to claim 2, wherein the processor is configured to change, in a case where the processor predicts that the autonomous mobile apparatus will come into contact with the obstacle, the planned emotion expression shape after the autonomous mobile apparatus in the planned emotion expression shape starts traveling along the planned traveling path.

11. The autonomous mobile apparatus according to claim 10, wherein the processor is configured to predict, after the autonomous mobile apparatus in the planned shape starts traveling along the planned traveling path, whether the autonomous mobile apparatus will come into contact with the obstacle.

12. The autonomous mobile apparatus according to claim 2, wherein:
the obstacle comprises a first obstacle and a second obstacle, and a space between the first obstacle and the second obstacle has a predetermined gap, and
the processor is configured to predict whether the autonomous mobile apparatus is capable of passing through the space between the first obstacle and the second obstacle.

13. The autonomous mobile apparatus according to claim 1, wherein the processor is configured to acquire the map information based on a captured image obtained by a camera that images surroundings of the autonomous mobile apparatus.

14. The autonomous mobile apparatus according to claim 1, wherein the processor is configured to acquire the map information using a SLAM technique.

15. A method for controlling an autonomous mobile apparatus, the method comprising:
acquiring a state relating to the autonomous mobile apparatus;
acquiring map information including positional information of an obstacle;
planning, based on the acquired state and the acquired map information, a shape of the autonomous mobile apparatus and a traveling path of the autonomous mobile apparatus, to cause the autonomous mobile apparatus to express an emotion and to avoid contact between the autonomous mobile apparatus and the obstacle when the autonomous mobile apparatus is traveling along the traveling path; and causing the autonomous mobile apparatus to autonomously travel along the planned traveling path while assuming the planned shape, wherein the autonomous mobile apparatus is configured as a robot mimicking a human being or an animal.

16. A non-transitory recording medium that stores a program that is executable by a computer of an autonomous mobile apparatus, the autonomous mobile apparatus being configured as a robot mimicking a human being or an animal, and the program being executable to control the computer to:

acquire, from a sensor of the autonomous mobile apparatus, a state relating to the autonomous mobile apparatus;

acquire map information including positional information of an obstacle;

plan, based on the acquired state and the acquired map information, a shape of the autonomous mobile apparatus and a traveling path of the autonomous mobile apparatus, to cause the autonomous mobile apparatus to express an emotion and to avoid contact between the autonomous mobile apparatus and the obstacle when the autonomous mobile apparatus is traveling along the traveling path; and cause the autonomous mobile apparatus to autonomously travel along the traveling path while assuming the planned shape.

* * * * *